United States Patent
Rechter et al.

(10) Patent No.: US 9,891,619 B2
(45) Date of Patent: Feb. 13, 2018

(54) DEVICE FOR CHECKING THE CONSTRUCTION OF AN EXTRUDER SCREW

(71) Applicant: LEISTRITZ EXTRUSIONSTECHNIK GMBH, Nürnberg (DE)

(72) Inventors: Frank Rechter, Uffenheim OT Welbhausen (DE); Sven Wolf, Oberasbach (DE)

(73) Assignee: LEISTRITZ EXTRUSIONSTECHNIK GMBH, Nürnberg (DE)

( * ) Notice: Subject to any disclaimer, the term of this patent is extended or adjusted under 35 U.S.C. 154(b) by 422 days.

(21) Appl. No.: 14/551,966

(22) Filed: Nov. 24, 2014

(65) Prior Publication Data

US 2015/0148932 A1 May 28, 2015

(30) Foreign Application Priority Data

Nov. 25, 2013 (DE) .......... 10 2013 112 971

(51) Int. Cl.
*B29B 7/72* (2006.01)
*B29C 47/96* (2006.01)
(Continued)

(52) U.S. Cl.
CPC .......... *G05B 19/41875* (2013.01); *B29B 7/72* (2013.01); *B29C 47/0825* (2013.01);
(Continued)

(58) Field of Classification Search
None
See application file for complete search history.

(56) References Cited

U.S. PATENT DOCUMENTS 3,937,776 A * 2/1976 Hold ............... B29C 45/76
  264/328.13
5,425,906 A * 6/1995 Hashimoto ........ B29C 45/77
  264/328.1

(Continued)

FOREIGN PATENT DOCUMENTS

DE  19744443 C1  10/1998
DE  10338180 B3   4/2005
(Continued)

OTHER PUBLICATIONS

Marius Janas: "Zukunftsweisende Prozessoptimierung", Kunststoffe, Bd . 2013, No. 12, Dec. 17, 2013 (Dec. 12, 2013), pp. 38-41, XP055182439.
(Continued)

*Primary Examiner* — Ronald Hartman, Jr.
(74) *Attorney, Agent, or Firm* — Lucas & Mercanti, LLP; Klaus P. Stoffel (57) ABSTRACT

A device for checking the construction of an extruder screw having a shaft and screw elements that are to be pushed or have been pushed one after the other onto the shaft in a defined sequence. Each screw element has an element-specific external geometry. A recording device being provided for determining information concerning the sequence of the screw elements that are to be pushed on or have been pushed on and for comparing the information determined with target information, which directly or indirectly describes the target sequence.

26 Claims, 3 Drawing Sheets

(51) Int. Cl.
*B29C 47/92* (2006.01)
*B29C 47/60* (2006.01)
*G05B 19/418* (2006.01)
*B29C 47/08* (2006.01)

(52) U.S. Cl.
CPC .............. *B29C 47/60* (2013.01); *B29C 47/92* (2013.01); *B29C 47/96* (2013.01); *B29C 2947/924* (2013.01); *B29C 2947/9239* (2013.01); *B29C 2947/92285* (2013.01); *B29C 2947/92304* (2013.01); *G05B 2219/31359* (2013.01)

(56) References Cited

U.S. PATENT DOCUMENTS

| | | | |
|---|---|---|---|
| 6,118,374 A | 9/2000 | Saatkamp | |
| 6,406,174 B2* | 6/2002 | Bacher | B29C 47/0871 366/142 |
| 6,790,023 B2* | 9/2004 | Collins | B29C 47/92 425/145 |
| 7,654,809 B2* | 2/2010 | Takatsugi | B29C 45/52 425/145 |
| 8,316,297 B2 | 11/2012 | Grimm et al. | |
| 2001/0050446 A1* | 12/2001 | Konno | B29C 45/76 264/40.1 |
| 2006/0112755 A1* | 6/2006 | Kuhman | G01N 3/56 73/7 |
| 2008/0129240 A1* | 6/2008 | Park | B29C 45/76 318/602 |
| 2012/0306113 A1* | 12/2012 | Kershaw | B29C 45/542 264/40.7 |
| 2014/0039808 A1* | 2/2014 | Shibata | B29C 45/60 702/34 |

FOREIGN PATENT DOCUMENTS

| | | | |
|---|---|---|---|
| DE | 10 2007 021 037 A1 * | 11/2008 | .............. B29C 47/92 |
| EP | 2065162 A2 | 6/2009 | |
| JP | 05-309721 A * | 11/1993 | .............. B29C 47/92 |
| WO | 2006103130 A2 | 10/2006 | |

OTHER PUBLICATIONS

Matthew H. Naitove et al: "Produkte aus Nordamer i ka and Kanada auf der K2004", Kunststoffe, Bd. 2004, No. 10, Oct. 31, 2004 (Oct. 31, 2004), pp. 2-17, XP055182443.
Coperion Gmbh: "Vorbeugende Verschleißdiagnose stellt Produktqualität sicher", kunststoffFORUM, Feb. 17, 2011 (Feb. 17, 2011), XP055182451, Wolfsburg Gefunden im Internet: URL:http://www.kunststoffforum.de/information/news vorbeugende-verschleissdiagnose-stellt-produktqualitaet-sicher [gefunden am Apr. 13, 2015].
Office Action from corresponding EP Application No. 14 191 701.3-1706; dated Jun. 22, 2016 (9 Pages).
"Bedienungsanleitung Kidizoom Twist," 17, Jun. 2011 (34 Pages).
First Office Action from corresponding Chinese Patent Application No. 201410685985.6, dated Aug. 3, 2016.

* cited by examiner

FIG. 1

→ Actual: a-b-b-a-c-b-b-a-c-b-a-a-a
→ Target: a-b-b-a-c-b-b-a-c-b-a-a-a

DEVICE FOR CHECKING THE CONSTRUCTION OF AN EXTRUDER SCREW

TITLE OF THE INVENTION

The present application claims priority of DE 10 2013 112 971.4, filed Nov. 25, 2013, the priority of this application is hereby claimed and this application is incorporated herein by reference.

BACKGROUND OF THE INVENTION

The invention concerns a device for checking the construction of an extruder screw consisting of a shaft and screw elements that are to be pushed or have been pushed one after the other onto said shaft in a defined sequence, each screw element having an element-specific external geometry.

As is known, extruders serve for preparing compounds that are being processed in a working unit or a barrel by way of one or more extruder screws rotating there. Merely by way of example, mention may be made of polymer compounds, which are melted and compounded in the extruder, to be subsequently processed further, for example for the forming of granules of plastic, or in the course of injection-molding work for the production of components and the like. Mention may also be made by way of example of pharmaceutical compounds that serve for the production of medicaments, for example in the form of tablets. Here, too, the corresponding materials are processed and mixed etc. in the barrel by way of the screws, in order to achieve the desired homogeneous composition of the extrudate. In order to make this possible, one or more further devices is/are provided on the working unit or assigned to the working unit, such as for example corresponding feeding devices, by way of which the materials to be processed are charged in a metered manner, or heating devices, which serve for controlling the temperature of the barrel or the barrel sections from which such a barrel is usually composed, and the like. Also in the food sector, corresponding compounds are often prepared using an extruder.

The one or more extruder screws serving directly for the processing of the material is/are essential for the function of the extruder. Depending on the material to be prepared and according to the corresponding working task, a distinction can be made between different types of screw. Known screws are those referred to as compact screws, which are made from one piece. This means that the specific screw geometry is fashioned directly from a single block of material. Other known screws are those referred to as fitted extruder screws, in the case of which a multiplicity of individual screw elements are fitted in series onto a shaft, the screw elements and the screw shaft being connected to one another in a fixed rotational relationship by way of corresponding interlocking tooth arrangements. Each screw element has a certain geometry, which gives the screw element its typical function. Usually 20-30 individual screw elements, if need be even more, are fitted onto a shaft, so that in the end a relatively complex overall geometry is obtained. Each individual extruder screw produced in this way is thereby designed very specifically with regard to its geometry for a certain working process, which means that a certain screw is assigned to a certain working task, which in turn is assigned specific operating parameters, which the operator of the control device must set for operating the extruder. This means that the sequence in which the individual screw elements are pushed onto the shaft must be precisely maintained in order to avoid fitting errors, which would result in a changed geometry that is unsuitable for the intended working process. Since each individual screw element is allocated a certain function, for example a conveying function or a kneading function or a mixing function and the like, in each case resulting from the element-specific external geometry, each fitting error consequently has the effect that—if the wrongly fitted screw shaft can be installed at all—the desired working result is not achieved.

Even if the operator applies a high degree of precision and care when fitting together or constructing the extruder screw, fitting errors can nevertheless not be ruled out entirely, since it is a purely manual activity that is concerned.

SUMMARY OF THE INVENTION

The invention addresses the problem of providing a possibility that offers certainty with respect to the construction of such a fitted-together extruder screw.

To solve this problem, a device for checking the construction of an extruder screw consisting of a shaft and screw elements that are to be pushed or have been pushed one after the other onto said shaft in a defined sequence, each screw element having an element-specific external geometry, is provided according to the invention, which device is distinguished by the fact that a recording device is provided for determining information concerning the sequence of the screw elements that are to be pushed on or have been pushed on and for comparing the information determined with target information, which directly or indirectly describes the target sequence.

The invention proposes with particular advantage a testing device, which makes it possible already during the construction of the extruder screw or after the construction of the extruder screw to test in an automated manner whether the construction that is in progress or the construction that has already taken place is correct, and consequently therefore whether or not the defined, prescribed fitting sequence of the individual screw elements is maintained. Provided for this purpose is a recording device, which serves for determining information concerning the sequence of the screw elements that are to be pushed on during the construction of the screw or, in the case of the already completed screw, screw elements that have already been pushed on. This information, which may vary in its nature, which will be further discussed below, therefore concerns the actual state of the fitting sequence of the screw elements that is in progress or has already been completed. The recording device is thus also designed for comparison of this determined information with target information that describes the target sequence directly or, depending on the type of information, also indirectly. This means that this target information is stored in a corresponding controlling and processing device and is used as comparison information. From this actual-target comparison, it can thus be recorded directly as a result of the comparison whether during the fitting process that is in progress a screw element to be fitted on is the correct one, or whether an incorrect screw element is inadvertently to be fitted on, or, in the case of a completely fitted-together screw, whether the sequence there is correct, or whether a fitting error has crept in. It goes without saying that the corresponding result of the comparison, whether it is a result of the comparison determined during the fitting operation that is in progress or whether it is a result of the comparison determined after completion of the fitting operation, can be correspondingly output, and consequently therefore can be brought to the attention of the operator, so that the latter can react immediately and rectify any error there may be.

The checking device according to the invention consequently allows highly accurate checking of the fitting sequence and is capable of immediately detecting and communicating any fitting errors, so that either an imminent fitting error can be avoided, or an existing fitting error can be immediately corrected.

For the recording of information concerning the respective screw element that is to be pushed on or has been pushed on or concerning the actual geometry of the completely fitted-together extruder screw, defined by the individual screw elements, a sensor means is preferably provided for the recording device, while a controlling and processing device is also provided for comparing the information recorded with the target information that describes the sequence of the screw elements that are to be pushed on or have been pushed on one after the other or the target geometry of the extruder screw. The sensor means provided according to the invention is therefore capable of either recording screw-element-specific information or actual-geometry information with respect to the completely fitted-together extruder screw. Depending on which type of information is recorded by the sensor means, the integrated controlling and processing device is designed for corresponding comparison with target information, that is to say likewise corresponding element-specific information or target-geometry information. A corresponding direct comparison is consequently possible.

Preferably, the sensor means and the extruder screw or the screw elements that are to be pushed on are movable in relation to one another. This means that either a fixed sensor means is provided, past which the individual screw elements that are to be pushed on or the completely fitted-together extruder screw is/are moved. As an alternative to this, it is also conceivable to provide a movable sensor means, which is for example moved in relation to the completely fitted-together extruder screw, in order to scan it.

According to a first alternative of the invention, each screw element may have an element-specific transponder, the sensor means being a reading device for recording the transponder information. In each element-specific transponder there is stored an element-specific item of information, which identifies the screw element. By means of a reading device, this element-specific item of transponder information can thus be recorded. Corresponding element-specific target information is stored in the controlling and processing device in such a way that the corresponding, defined target sequence is determined by way of this information. The controlling device can thus detect immediately on the basis of the transponder information recorded whether the screw element recorded is a screw element that is being or has been fitted on positionally correctly according to the target sequence, or whether another screw element should have been positioned instead of the screw element recorded.

When a completely fitted-together screw is being checked, the reading device may in this case be made to move along the extruder screw, so that it travels along all the screw elements and records their individual items of transponder information. Either the respective comparison with the stored element-specific target information can take place in parallel with this, so that, for example when an error is recorded, the reading device stops directly at the location of the error, that is to say the position where there is an erroneously fitted screw element. Alternatively, the reading device may also be made to move along the entire screw shaft and record an "information profile", and consequently therefore read out all the items of transponder information and transfer the entire information package to the target comparison.

An alternative to this envisages recording the transponder information already during the fitting-on operation and performing the comparison directly, so that, in the event of an imminent error, a pending fitting-on operation can already be prevented by issuing a corresponding alarm signal. For this purpose, the transponder is expediently arranged on an end face or a lateral surface of a bore of the respective screw element, the reading device being arranged on a carrier that is to be detachably arranged on the shaft. The screw elements are always fitted onto a defined end of the shaft. The reading device is arranged in this region, either on the shaft itself or alongside it. The transponder is located either on the front end face of the screw element, that is to say made to face the shaft, or in the region of the element bore, where the interlocking tooth arrangement is formed. In any event, the transponder is forced to enter the reading region of the reading device, so that the transponder information can be recorded. If, therefore, a screw element approaches the reading device, which is fastened for example to the shaft itself by way of the carrier, the transponder information is recorded and directly compared. In the case of a wrong screw element, an alarm signal can be issued immediately, so that the screw element is not fitted on in the first place. In this case, the reading device may as it were be positioned axially, and consequently therefore set up a direct communication link with the transponder on the end face, or be arranged radially, so that there is a communication link with the transponder likewise arranged radially in the inner bore.

As an alternative to the recording of the transponder information during the fitting-on operation, it is also conceivable to record the transponder information on the fitted extruder screw when it is introduced into the extruder. For this purpose, the reading device is arranged on the extruder itself, if appropriate detachably, in such a way that the transponder information can be recorded automatically when the extruder screw is pushed into the extruder. This means that the reading device is mounted by way of a corresponding carrier on the discharge end of the processing unit, that is to say the barrel. Since the extruder screw is also pushed in from this side, all of the transponders inevitably enter the reading region of the reading device during the pushing-in movement, and their information can be recorded and compared. If an error is recorded, the further pushing-in movement can be stopped immediately, the screw pulled off once more and removed, in order to rectify the error.

The alternative described above envisages information recording on a transponder basis. As an alternative to this, the sensor means may be an optical sensor means, with which information describing the actual geometry of the extruder screw can be recorded. By way of such an optical sensor means, contour recording is consequently performed, that is to say the actual exterior extruder screw geometry is determined and subjected to subsequent analysis or comparison. Here, too, various refinements or various optical sensor means can be used.

According to a first alternative of the invention, a laser, with which the surface of the extruder screw is scanned along a line for recording the height profile, may be used as the sensor means, the height profile being evaluated by the controlling and processing device. Each screw element has an external geometry defining its function. The laser is made to move along the screw, so that a height profile is scanned.

Stored in the comparing and processing device is a comparison profile, which is compared with the actual height profile, whereby corresponding fitting errors can be recorded.

This refinement of the invention additionally makes possible not only the recording of any sequence-related fitting errors, but also orientation errors. As described at the beginning, the screw shaft has an external interlocking tooth arrangement and each screw element has an internal interlocking tooth arrangement. The screw elements must therefore not only be fitted on in the correct sequence, but also in the correct angular position. This is so because, in the case of twin-screw extruders in particular, two extruder screws mesh with one another, so that the corresponding screw elements also have to be in a defined angular position during the insertion of the extruder screws, in order to make correct shaft engagement possible. As result of this, the recorded actual height profile is angle-dependent. A conveying element for example, which has an external screw geometry, of course changes the corresponding height profile with respect to the positionally fixed scanning line if the screw element is fitted on in different angular positions. The "fitting plan" thus not only specifies to the operator the sequence but also the corresponding angular position in which the respective fitting element is to be pushed on. The comparison profile stored in the controlling device is also designed with respect to the prescribed, defined angular position. Consequently, not only fitting errors, but indeed also corresponding angular errors can inevitably be recorded exactly.

As an alternative to the use of a laser, a camera, which takes images of the extruder screw which are processed, in particular by the controlling and processing device, for determining the information on the actual geometry, may also be used as the optical sensor means. Also with a camera, which either takes single images or records a video sequence, the actual geometry can be recorded. This is so because the individual surfaces of the screw elements can be seen in the surface images. Within the camera images, the corresponding geometry information is thus analyzed by the camera, or if appropriate the controlling and processing device, for which purpose corresponding analysis and detection algorithms are used. For example, edge detection algorithms are used to determine in the images the corresponding edges of the element geometries. As described, a conveying element has a screw-shaped helical edge structure, while a kneading element, which usually has a number of egg-shaped kneading units arranged one behind the other and offset by defined angular amounts, has in turn a different specific edge geometry, which can readily be analyzed in the corresponding camera images by suitable processing software. In turn, the resultant actual geometry information is compared with corresponding comparison information, in order to determine a test result. Here, too, it goes without saying that it is possible for any angular positional errors to be recorded. This is so because mounting of a screw element that is rotationally misaligned by one tooth engagement inevitably leads to an offset of the edge geometry which, though small, can nevertheless be analyzed or recorded, which in turn is recorded as an error during the comparison.

If a single-image camera is used, it moves for example step by step along the fitted extruder screw and takes a number of single images, for example 3-5 images. These single images are thus put together by the camera or the controlling and processing device to make an overall image, and consequently therefore superposed correspondingly at the borders, so that the images give an overall image in a positionally exact manner. It goes without saying that each part-image could also be analyzed and compared individually. In the case of a video camera, the entire video sequence consisting of a multiplicity of single images is subjected to image or edge analysis, and the comparison is subsequently performed on this basis.

Such a laser or a camera may for example also be arranged on the extruder itself, there on the processing unit, that is to say the barrel, at the discharge end. This allows the extruder screw to be recorded and checked when it is being pushed into the barrel, and in the presence of an error to be pulled off again immediately and constructed correctly.

A third alternative with respect to a sensor means that can be used envisages using as such a linear light source and a linear light sensor, the two being arranged opposite one another on different sides of the extruder screw in such a way that a shadow image of the region of the extruder screw located in between is recorded by the linear light sensor, the shadow image being evaluated, in particular by the controlling and processing device, for determining the information on the actual geometry. Also from the shadow image, which is likewise angle-dependent in its specific contour, it is likewise possible by suitable processing software, in particular an edge analysis, for the specific actual geometry of the screw to be recorded and compared with corresponding target information, either by the linear light sensor itself or by the controlling and processing device. This means that not only information with respect to the fitting position in the axial direction is also recorded from the shadow image, but also angular positional information, so that both axial and angular fitting errors can be recorded.

In a development of the invention, furthermore, a memory element, in particular a transponder, may be provided on the shaft, the device according to the invention having a writing device, by means of which information concerning the actual sequence of the screw elements that have been pushed on can be written in the memory element of the shaft. This memory element consequently carries corresponding information on the fitting sequence of the screw elements. It is preferably arranged on the shaft shank in the region of the end of the shank that is to be coupled with the drive unit. If a corresponding reading device, for example a transponder reader, is thus arranged on the extruder, this sequence information can be read out and passed to the controlling and processing device of the extruder when the extruder screw is being inserted. There, a comparison of the actual sequence with a target sequence, which is defined for the working process that is to be carried out by the extruder, can take place. It is therefore checked whether the actual fitting sequence is correct with respect to the intended working process. Only if this comparison has a positive outcome can the controlling device enable extruder operation.

The controlling and processing device that belongs to the device according to the invention may operate as a separate device, and consequently therefore only serve for checking the screw. However, it is expedient if the controlling and processing device is part of the extruder itself into which the extruder screw is to be inserted, therefore consequently also controls the extruder itself.

Apart from the device according to the invention, the invention also concerns a method for checking the construction of an extruder screw consisting of a shaft and screw elements that are to be pushed or have been pushed one after the other onto said shaft in a defined sequence, each screw element having an element-specific geometry. The method according to the invention is distinguished by the fact that, with a recording device, information concerning the sequence of the screw elements that are to be pushed on or have been pushed on is determined and compared with target information, which directly or indirectly describes the target sequence, checking information being output in dependence on the result of the comparison. The recording device used comprises a sensor means, with which information concerning the respective screw element that is to be pushed on or has been pushed on or concerning the actual geometry of the extruder screw, defined by the individual screw elements, is recorded, the information recorded being compared by a controlling and processing device with target information that describes the sequence of the screw elements that are to be pushed on or have been pushed on one after the other or the target geometry of the extruder screw.

The sensor means and the extruder screw or the screw elements that are to be pushed on are in this case moved in relation to one another for determining the information.

Various items of equipment may be used as sensor means. According to a first refinement of the invention, a reading device, in particular a transponder reader, with which the transponder information of an element-specific transponder arranged on the respective screw element is recorded as information, is used, it being possible for this reading device either to be arranged on an end of the shaft or assigned thereto, or on an extruder receiving the extruder screw itself.

As an alternative to recording transponder information, it is also conceivable that an optical sensor means, with which information of the extruder screw describing the actual geometry is recorded, can be used as the sensor means. Such a sensor means may be a laser, a camera, or a combination of a linear light source and a linear light sensor. All optical sensor means allow the recording of geometry information that allows both axial fitting errors and angular positional errors to be determined.

Further refinements of the method according to the invention can be taken from the corresponding subclaims.

Finally, the invention also concerns an extruder screw, comprising a shaft and a number of screw elements that can be pushed onto said shaft, that is suitable for being used in the course of a method in which corresponding transponder information concerning the fitting sequence is recorded as information. This extruder screw or the screw elements that are to be fitted onto the shaft are distinguished by the fact that an element-specific transponder is arranged on each screw element. This transponder is arranged either on an end face of the screw element or a lateral surface of a bore of the respective screw element, that is to say in the region of the interlocking tooth arrangement of the element. It therefore lies respectively at a position that makes a good communication link possible with a corresponding transponder reader, which is arranged either on the testing device described at the beginning or on the extruder itself.

BRIEF DESCRIPTION OF THE DRAWING

Further advantages, features and details of the invention emerge from the exemplary embodiments described below and on the basis of the drawing, in which.

DETAILED DESCRIPTION OF THE INVENTION

Figure 1:
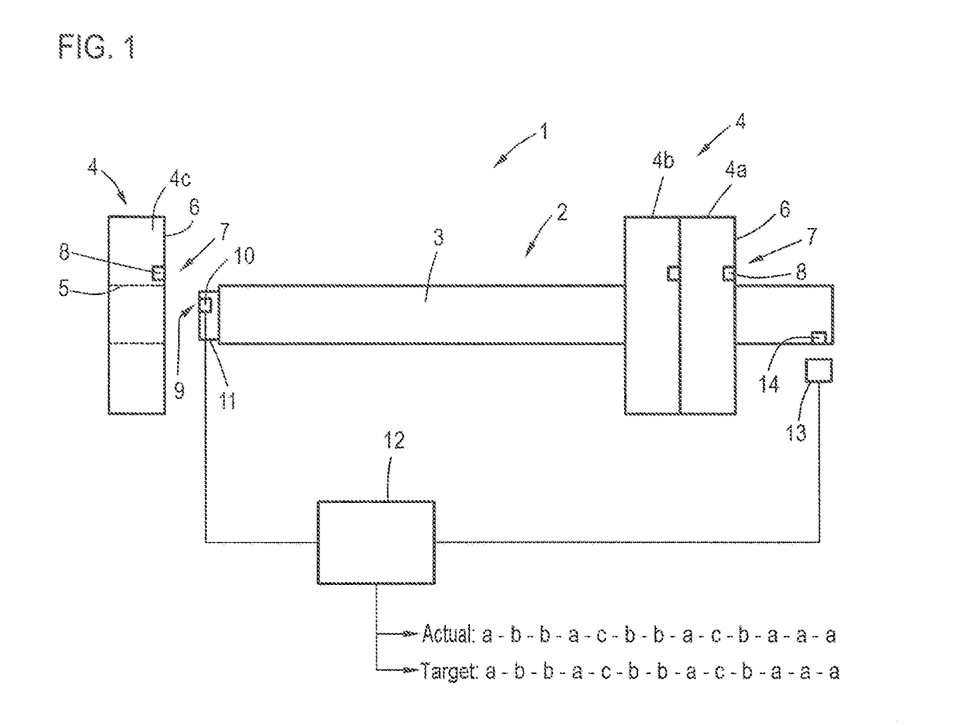
FIG. 1 shows a basic representation of a checking device according to the invention of a first embodiment on the basis of transponder recording.

FIG. 1 shows a device 1 according to the invention for checking the construction of an extruder screw 2. The extruder screw 2 consists of a shaft 3, onto which screw elements 4 can be pushed in almost any desired sequence. The shaft has an external interlocking tooth arrangement; each screw element 4 has in the region of its bore 5 a corresponding internal interlocking tooth arrangement, the external interlocking tooth arrangement and the internal interlocking tooth arrangement engaging in one another, so that a rotationally fixed connection is produced. The basic construction of such fitted extruder screws is sufficiently well known.

In the case of the device 1 according to the invention, each screw element 4 has on its end face 6 a memory element 7, here in the form of a transponder 8.

Each transponder 8 contains a stored item of information, which identifies the respective screw element 4.

It is usually possible in principle for a distinction to be made between three different screw element families, that is firstly conveying elements, secondly mixing elements and finally zoning elements. Conveying elements serve the purpose of conveying the material, therefore drawing it in for example or taking it past any openings in the barrel, and also conveying it through mixing elements and a downstream die or the like. Mixing elements serve the purpose of dispersing the material and/or processing it in a distributive manner. They may be for example kneading elements or the like. Zoning elements, finally, isolate two different processing regions in the extruder barrel from one another. They make it possible for example for the kneading region to be sealed off from a venting zone and the like.

The transponder 8 thus defines whether the respective screw element is a conveying element, a mixing element or a zoning element, the respective element families of course including within them different elements that serve a comparable purpose.

At the tip of the shaft 3 there is a reading device 9, here a transponder reader 10, which is arranged on a corresponding carrier 11, which may be detachably fastened to the shaft 3. The transponder reader 10 is axially aligned, so that a screw element 4 to be pushed on, with its transponder 8 on the front end face 6, is inevitably moved in the direction of the transponder reader 9. This brings about a corresponding communication between the transponder 8 and the transponder reader 10, which can thereby read out the transponder information directly.

The device 1 also comprises a controlling and processing device 12, to which the transponder information read out is passed. This controlling and processing device 12 is thus capable on the one hand of creating on the basis of all the successively recorded transponder information an item of actual information, which describes the sequence of the screw elements 4 pushed on one after the other. On the other hand, it is designed for comparing this actual information with target information available to it, which defines how the correct fitting sequence of the extruder screw 2 to be constructed looks. In dependence on the result of the comparison, it is then decided whether the extruder screw 2 has been constructed correctly or whether there is a fitting error. It goes without saying that a corresponding comparison may also take place continuously, so that it is not necessary to wait until the last screw element has been pushed on before performing the comparison. Rather, with every recorded screw element 4 that is to be newly pushed on, it can be recorded by way of the comparison whether it is the correct screw element or whether there is an error.

The controlling and processing device 12 also communicates with a writing device 13, which serves the purpose of writing the final actual information, which describes the actual sequence of the screw elements 4 that have been fitted on, in a memory 14, which is arranged in the region of the end of the shaft 3 to be connected to the drive unit. The memory element 14 may for example be in turn a transponder or the like. In this way, information that describes the actual sequence of the screw elements fitted on is therefore imprinted on the finished extruder screw 2. Thus, if this extruder screw is installed in an extruder, that is to say pushed into the barrel, the information on the actual sequence in the memory element 14 can be read out by a suitable reading device, which is coupled with the controlling and processing device of the extruder, and compared with information stored in said memory element that indicates which type of screw or which screw construction is required for the process that is subsequently to be carried out. Therefore, a comparison of whether this constructed screw is ultimately also the correct screw for the working process to be carried out by the extruder once again takes place here.

In the exemplary embodiment shown, by way of example two screw elements 4a and 4b have already been pushed onto the shaft 3. In the next step, the screw element 4c is pushed on. It is located with its transponder 8 in the reading-out region of the transponder reading device 10, so that the transponder information is recorded. It can be immediately compared in the controlling device 12 with the target information. If the comparison shows that it is the correct screw element 4c, which therefore by definition must be pushed on, a green luminous signal is shown for example, indicating that it is the correct screw element. If it is not the correct screw element, a red luminous signal may be output, indicating an error.

Merely by way of example, in FIG. 1 an example of a fitting sequence is indicated. The upper row, identified by "actual", indicates the actual sequence recorded. The row below, identified by "target", gives the target sequence. It should be assumed in the example shown that three types of screw element a, b and c are being fitted on, the element a being a conveying element, the element b being a mixing element and the element c being a zoning element. In the case of this exemplary embodiment, it is evident that the actual information, that is to say the actual sequence fitted, coincides with the target information, that is to say the target sequence; the extruder screw 2 is constructed correctly.

Figure 2:
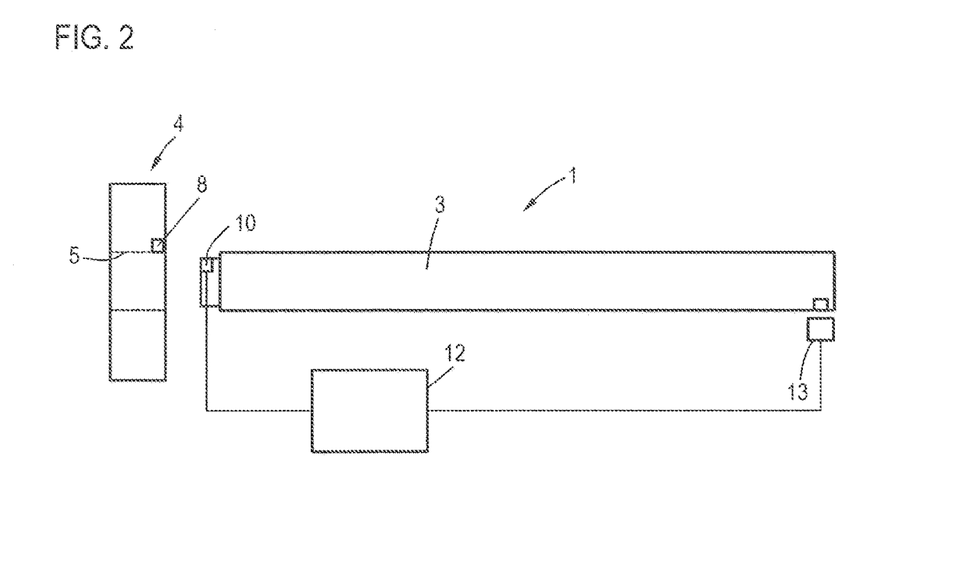
FIG. 2 shows a basic representation of a checking device according to the invention of a second embodiment on the basis of transponder recording.

FIG. 2 shows an alternative embodiment of a checking device 1, which to this extent corresponds to the embodiment from FIG. 1. The system also operates with transponder information recording, a transponder 8 in turn being arranged on the respective screw element 4, while the transponder reading device 10 is arranged on the end face of the shaft 3. In the case of this refinement, however, the transponder 8 is located in the bore 5 of the screw element 4, therefore is not directed axially but radially. Accordingly, the transponder reading device 10 is also aligned radially here, so that, when the screw element 4 is pushed onto the shaft 3, the transponder automatically enters the recording region of the transponder reading device 10. Otherwise, the function of the checking device 1 shown in FIG. 2 is the same as that of the device 1 from FIG. 1.

Figure 3:
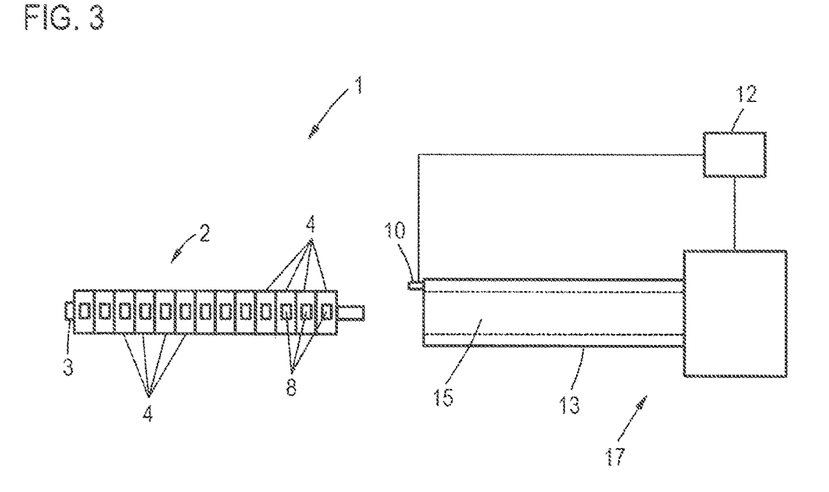
FIG. 3 shows a basic representation of a checking device according to the invention of a third embodiment on the basis of transponder recording.

FIG. 3 shows a basic representation of a further embodiment of a device 1 according to the invention for checking the screw element construction. In the case of this refinement of the invention, the extruder screw 2 has already been completely constructed, which means a multiplicity of individual screw elements 4 have already been fitted on the shaft 3. In turn, each screw element 4 has a transponder 8, which is only indicated here by way of example. Here, the checking of the completely fitted-together extruder screw 2 takes place at the moment at which the extruder screw 2 is pushed into the barrel 13 of the extruder 17, which is represented by way of example in FIG. 3. The barrel 13 has in a way known per se a barrel bore 15, for example configured as a double bore for receiving two extruder screws 2, which mesh with one another to form a twin-screw extruder. However, it is also possible that only a single bore is provided. On the input side of the bore 15, the transponder reading device 10 is arranged here. During the pushing-in operation, the extruder screw 2 is inevitably pushed past the fixed transponder reading device 10, so that each transponder 8 is inevitably taken past the transponder reading device 10 and can be read out. The transponder reading device 10 communicates here with the controlling and processing device 12, which here however at the same time scours the entire operation of the extruder 17, and consequently therefore also performs the actual checking of the fitting sequence of the extruder screw 2. Here, too, the comparison of the actual information just read out with the target information stored by the controlling and processing device 12 must take place continuously, and consequently therefore with each individual recording of transponder information. If an error is detected, an optical or acoustic alarm signal can be output directly, so that the extruder screw 2 is not completely pushed in in the first place. If, however, the sequence is in order, the extruder screw 2 can be pushed in completely. The extruder 17 can commence its operation.

Figure 4:
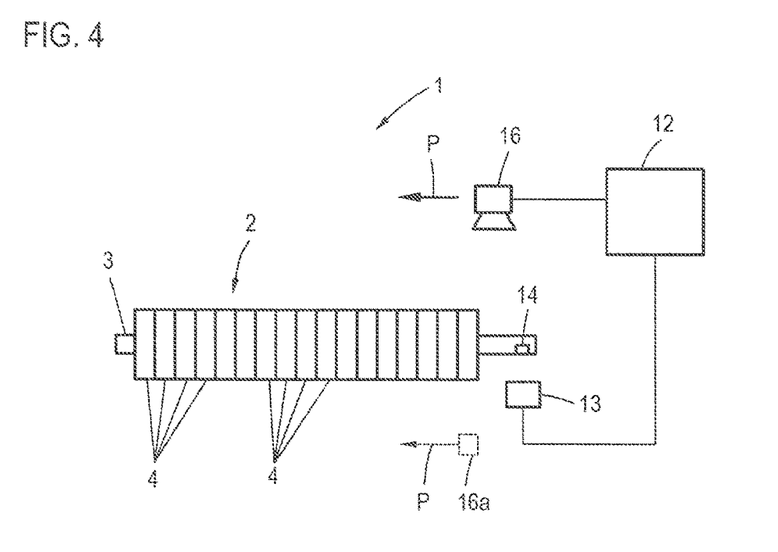
FIG. 4 shows a basic representation of a checking device according to the invention of a fourth embodiment on the basis of a longitudinally movable sensor means.

FIG. 4 finally shows a further embodiment of a device 1 according to the invention for checking an extruder screw 2, in the case of this exemplary embodiment the extruder screw 2 likewise having already been completely constructed, which means that all of the screw elements 4 have been pushed onto the shaft 3. The extruder screw 2, which is fixed in a positionally fixed manner on a corresponding holder or the like, is thus scanned with the aid of a sensor means 16, which, as represented by the arrow P, can be made to move axially along the extruder screw 2, in order to obtain actual information concerning the actual geometry of the extruder screw 2. Each extruder screw 2 is dependent in its external geometry on the screw elements 4 used and fitted on in a corresponding sequence. This means that the external geometry of the extruder screw 2 inevitably changes if for example screw elements 4 are arranged the wrong way round or, since the external interlocking tooth arrangement of the shaft 3 engages in the internal interlocking tooth arrangement of the screw elements 4, if a screw element 4 has not been fitted on in the correct angular position, that is to say is rotationally misaligned about the shaft axis. All of this inevitably leads to a changing of the external geometry, which of course is more serious if the fitting sequence is mixed up than if there is a rotationally misaligned angular position, that is for example if a screw element is just fitted on offset by one tooth engagement. However, even such a minor deviation of the external geometry from the target geometry can already be recorded by the device 1 according to the invention.

For this purpose, the sensor means 16 moves along the arrow P along the extruder screw 2, which is arranged in a defined angular position on the holder that is not shown here any more specifically. Depending on how the sensor means 16 is designed or operates, corresponding actual information concerning the external geometry is recorded. In the controlling and processing device 12, this actual information is thus compared with target information; in dependence on the result of the comparison, it is then found whether the extruder screw 2 has been constructed correctly, or whether there is an error. This error may even be indicated in a locally resolved manner, so that the operator is directly informed where the error is, and therefore which screw element 4 is to be exchanged or turned. For this purpose, the control device 12 is of course assigned a corresponding indicating means, such as a display or the like, by way of which any issuing of signals and the like can also take place.

Also assigned in turn is the writing device 13, which makes it possible to store corresponding information in the memory element 14.

Figure 5:
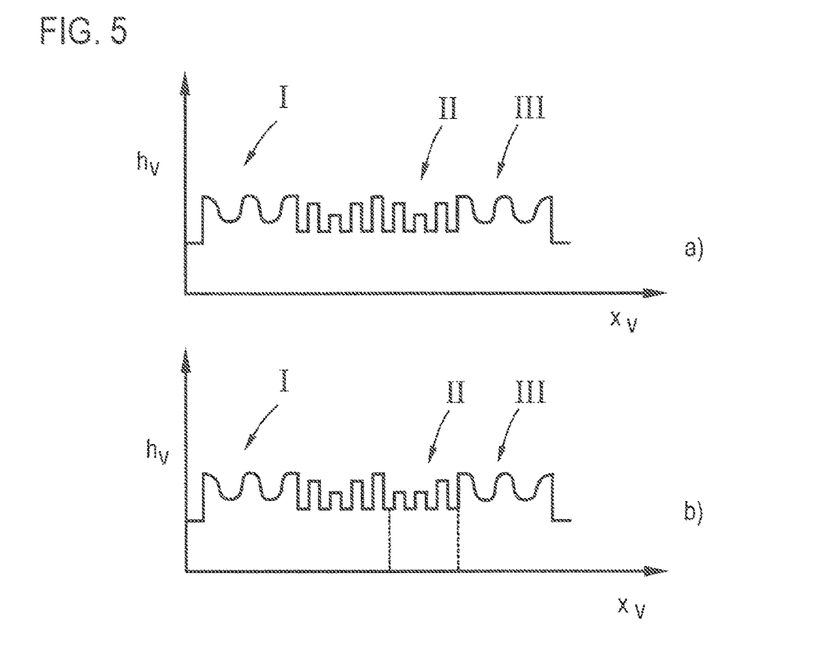
FIG. 5 shows a basic representation of actual information recorded and target information serving for purposes of comparison when using a sensor means creating a height profile.

The sensor means 16 may for example be a laser, which scans the surface of the extruder screw 2 with a sharply focused beam along a defined line, and with the information of which a height profile along the scanned line can be created. An example of such a scanned height profile is represented in FIG. 5, the upper diagram there, identified by a). Along the abscissa, the distance traveled, that is to say the position, is plotted with x; along the ordinate, the respective height is plotted with h. It is evident that a very characteristic height profile is obtained, in the example shown with three distinct zones I, II and III. The zones I and III are defined for example by conveying elements that have screw-shaped external geometries, while the zone 2 is defined by mixing or kneading elements, which are arranged offset by a defined angular amount about the longitudinal axis, so that the stepped profile shown in zone II forms.

FIG. 5a) shows the actual profile recorded, that is to say the actual information recorded, while FIG. 5b) shows the target profile, that is to say the target information serving for purposes of comparison. Plotted in turn along the abscissa is the distance $x_v$, and along the ordinate the height profile h. There are in turn distinct portions I, II and III, it being evident that the portions I and III are identical in the two part-figures a) and b), so that there is no error there.

In the subregion II, however, it is evident that a profile deviation can be found. While in the left-hand region of the stepped portion II the two profiles still coincide, in the region between the two dashed vertical lines there is a clear profile deviation, which is attributable to the fact that, though a mixing or kneading element has been installed there, it has been pushed onto the external interlocking tooth arrangement of the extruder shaft 2 while rotationally misaligned, for example by one angular increment. This means that this linear scanning, that is to say the comparison by way of the external geometry, not only makes it possible to record the installation of a wrong screw element, for instance of the wrong type, but also additionally to record any error with respect to the angular position of installation.

It goes without saying that an extruder screw has of course many more such regions, or consists of many more screw elements, and consequently therefore the height profile is of course also longer. FIG. 5 serves merely for purposes of explanation; the basic functional principle is readily evident from it.

Figure 6:
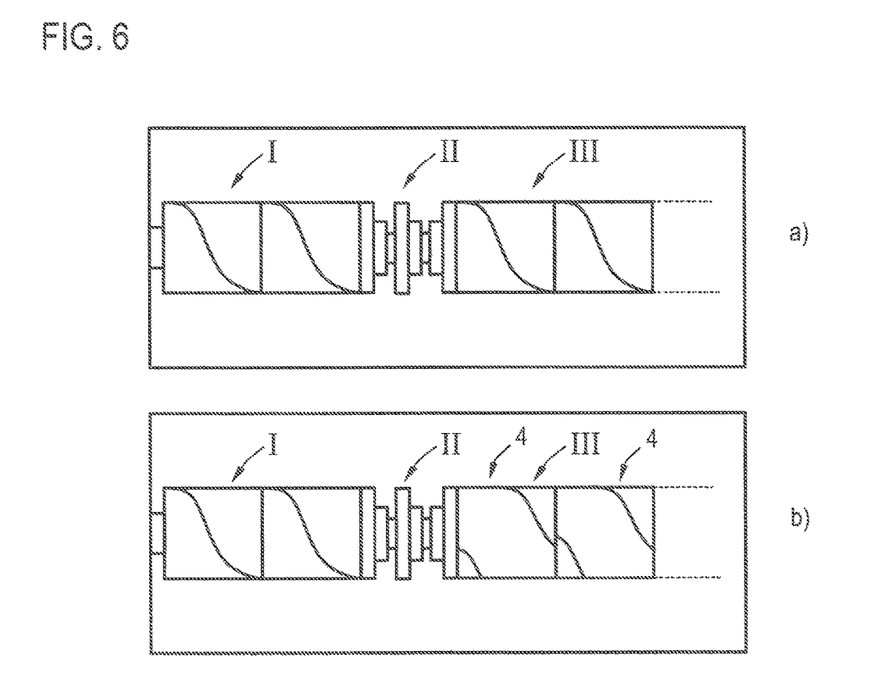
FIG. 6 shows a basic representation of actual information recorded in the form of one or more images and corresponding target information serving for purposes of comparison when using an image-recording sensor means.

FIG. 6 shows in the part-figures a) and b) a second possible way in which an inspection of the screw can take place on the basis of checking the external geometry. In the case of this refinement, the sensor means 16 is a camera, which takes single images or records a video sequence. The sensor means 16 is made to move along the arrow P, for example into defined recording positions, so that for example three, four or five separate single images of the entire extruder screw 2 are taken. The controlling device 12 puts these individual images together and creates as it were an overall image of the complete extruder screw 2. By way of suitable evaluation algorithms, for example edge detection algorithms and the like, the controlling and processing device 12 is thus capable of recording in detail within the images the corresponding edges, and consequently also the profile, of the external geometry of the extruder screw 2.

FIG. 6a) shows by way of example a detail from such an overall image of the extruder screw or the analyzed edge profiles, which show the actual geometry. Here in turn the three regions I, II and III are evidently represented by way of example, in a way comparable to FIG. 5. Here, however, they are not represented as a linear profile, but as a true representation of the external geometry or edge analysis of the external geometry. Part-figure b) in FIG. 6 shows the target information, that is to say the target geometry either of the single image recorded or of the corresponding result of the edge analysis. It is evident that in the case of this refinement the geometries in the regions I and II coincide, but in the region III there is an evident mounting error. This is so because the two screw elements 4 shown there by way of example have been pushed onto the shaft 3 while rotationally misaligned in their angular position. It is evident that the profile of the wave-like edge, which represents the shoulder of the conveying screw, does not coincide between the target and actual geometries. This means that the two screw elements 4 have quite obviously likewise been installed in an incorrect angular position. It is consequently also possible by way of these single images or image analysis with respect to edges of the geometry and the like for an exact recording of the error to take place.

The sensor means 16, that is to say the laser or the chamber, may—in a way corresponding to the example from FIG. 3—also be arranged on the barrel of the extruder, so that, also when using this sensor means, the scanning or recording of the extruder screw takes place when the extruder screw is being pushed into the barrel, and similarly the evaluation of the information or the comparison of the information. Given the correct screw, extruder operation can begin, otherwise it cannot.

While angular positional errors are respectively shown in FIGS. 5 and 6, it is obvious that installation of a screw element that is of the wrong type would of course lead to still more serious differences within the respective height profiles according to FIG. 5 or the images of the external geometry according to FIG. 6. This is so because, if for example a mixing element is installed instead of a conveying element, a completely different external geometry is encountered in this region, which is obvious.

While FIGS. 5 and 6 describe the use of a sensor means 16 in the form of a laser or a camera, it is also conceivable to use as it were a two-part sensor means as the sensor means 16, comprising a linear light source, which is made to move in the direction of the arrow P above the extruder screw 2, and a linear light sensor, which is represented by way of example in FIG. 4 by dashed lines and is represented by the reference numeral 16a, and is made to move in the direction of the likewise dashed arrow P parallel to the linear light source. On account of the illumination of the extruder screw 2 from the upper side by the linear light source, the linear light sensor records a shadow image of the extruder screw 2 located in between. It goes without saying that this shadow image likewise reproduces the external geometry of the extruder screw 2. The controlling and processing device 12 is thus capable of comparing this actual shadow image with a target shadow image. In turn, corresponding construction errors can be determined from this.

The invention claimed is:

1. A device for checking the construction of an extruder screw including a shaft and screw elements that are to be pushed or have been pushed one after the other onto said shaft in a defined sequence, each screw element having an element-specific external geometry, wherein the device for checking comprises a recording device for determining information concerning the sequence of the screw elements that are to be pushed on or have been pushed on and for comparing the information determined with target information, which directly or indirectly describes a target sequence of the screw elements, the recording device providing an indication to a user based on whether the information determined matches the target information.

2. The device according to claim 1, wherein the recording device comprises a sensor for recording information concerning the respective screw element that is to be pushed on or has been pushed on or concerning an actual geometry of the extruder screw, defined by the individual screw elements, and a controlling and processing device for comparing the information recorded with target information that describes the sequence of the screw elements that are to be pushed on or have been pushed on one after the other or the target geometry of the extruder screw.

3. The device according to claim 2, wherein the sensor and the extruder screw or the screw elements that are to be pushed on are movable in relation to one another.

4. The device according to claim 2, wherein each screw element has an element-specific transponder, and in that the sensor is a reading device for recording transponder information.

5. The device according to claim 4, wherein the transponder is arranged on an end face or a lateral surface of a bore of the respective screw element, and in that the reading device is arranged on a carrier that is to be arranged on or in the region of the shaft.

6. The device according to claim 4, wherein the reading device is arranged on an extruder receiving the extruder screw, in such a way that the transponder information can be recorded automatically when the extruder screw is pushed into the extruder.

7. The device according to claim 2, wherein the sensor is an optical sensor, with which information describing the actual geometry of the extruder screw can be recorded.

8. The device according to claim 7, wherein the optical sensor is a laser, with which the surface of the extruder screw is scanned along a line for recording a height profile, the height profile being evaluated by the controlling and processing device.

9. The device according to claim 7, wherein the optical sensor is a camera, which takes images of the extruder screw, which are processed, in particular by the controlling and processing device, for determining the information on the actual geometry.

10. The device according to claim 7, wherein the sensor comprises a linear light source and a linear light sensor, the two being arranged opposite one another on different sides of the extruder screw in such a way that a shadow image of the region of the extruder screw located in between is recorded by the linear light sensor, the shadow image being evaluated, by the controlling and processing device, for determining the information on the actual geometry.

11. The device according to claim 2, wherein the controlling and processing device is part of an extruder into which the extruder screw is to be inserted.

12. The device according to claim 1, wherein a memory element, is provided on the shaft, and in that a writing device is provided, by means of which information concerning the sequence of the screw elements that have been pushed on can be written in the memory element.

13. A method for checking the construction of an extruder screw including a shaft and screw elements that are to be pushed or have been pushed one after the other onto said shaft in a defined sequence, each screw element having an element-specific external geometry, wherein, with a recording device, information concerning the sequence of the screw elements that are to be pushed on or have been pushed on the shaft is determined, the determined information is compared with target information, which directly or indirectly describes a target sequence, and checking information is output to a user based on whether the determined information matches the target information.

14. A method according to claim 13, wherein the recording device comprises a sensor, with which information concerning the respective screw element that is to be pushed on or has been pushed on or concerning the actual geometry of the extruder screw, defined by the individual screw elements, is recorded, and in that the information recorded is compared by a controlling and processing device with the target information that describes the sequence of the screw elements that are to be pushed on or have been pushed on one after the other or the target geometry of the extruder screw.

15. A method according to claim 14, wherein the sensor and the extruder screw or the screw elements that are to be pushed on can be moved in relation to one another for determining the information.

16. A method according to claim 14, wherein the sensor includes a reading device, with which transponder information of an element-specific transponder arranged on the respective screw element is recorded as information.

17. A method according to claim 16, wherein the reading device is arranged on a carrier that is to be detachably arranged on the shaft and screw elements on which the transponder is arranged on an end face or a lateral surface of a bore of the respective screw element are used.

18. A method according to claim 16, wherein the reading device is arranged on an extruder receiving the extruder screw, the transponder information being recorded automatically when the extruder screw is pushed into the extruder.

19. A method according to claim 14, wherein the sensor includes an optical sensor, with which information of the extruder screw describing the actual geometry is recorded.

20. A method according to claim 19, wherein the optical sensor includes a laser, with which the surface of the extruder screw is scanned along a line for recording a height profile, the height profile being evaluated by the controlling and processing device.

21. A method according to claim 19, wherein the optical sensor includes a camera, which takes images of the extruder screw that are processed, in particular by the controlling and processing device, for determining the information on the actual geometry.

22. A method according to claim 19, wherein the sensor includes a linear light source and a linear light sensor arranged opposite one another on different sides of the extruder screw in such a way that a shadow image of the region of the extruder screw located in between is recorded by the linear light sensor, the shadow image being evaluated, in particular by the controlling and processing device, for determining the information on the actual geometry.

23. A method according to claim 14, wherein the controlling and processing device of the extruder into which the extruded screw is to be inserted is used as the controlling and processing device.

24. An extruder screw, comprising a shaft and a number of screw elements that can be pushed out onto said shaft, suitable for use in a method according to claim 13, wherein an element-specific transponder is arranged on each screw element.

25. An extruder screw according to claim 24, wherein the transponder is arranged on an end face or a lateral surface of a bore of the respective screw element.

26. A method according to claim 13, wherein a writing device is used to write in a memory element provided on the shaft information concerning the sequence of the screw elements that have been pushed on the shaft.

* * * * *